US007958184B2

(12) United States Patent
Barsness et al.

(10) Patent No.: US 7,958,184 B2
(45) Date of Patent: Jun. 7, 2011

(54) NETWORK VIRTUALIZATION IN A MULTI-NODE SYSTEM WITH MULTIPLE NETWORKS (75) Inventors: Eric L. Barsness, Pine Island, MN (US); David L. Darrington, Rochester, MN (US); Amanda Peters, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 12/041,846

(22) Filed: Mar. 4, 2008

(65) Prior Publication Data
US 2009/0228541 A1 Sep. 10, 2009

(51) Int. Cl.
G06F 15/16 (2006.01)
(52) U.S. Cl. ......................... 709/201; 709/200
(58) Field of Classification Search .................. 709/200, 709/201
See application file for complete search history.

(56) References Cited

U.S. PATENT DOCUMENTS

| | | | | | |
|---|---|---|---|---|---|
| 5,689,646 | A | * | 11/1997 | Thorson | 709/239 |
| 5,970,232 | A | * | 10/1999 | Passint et al. | 709/238 |
| 6,374,297 | B1 | * | 4/2002 | Wolf et al. | 709/226 |
| 2003/0130833 | A1 | * | 7/2003 | Brownell et al. | 703/23 |
| 2004/0078493 | A1 | | 4/2004 | Blumrich et al. | |
| 2004/0103218 | A1 | * | 5/2004 | Blumrich et al. | 709/249 |
| 2004/0210623 | A1 | * | 10/2004 | Hydrie et al. | 709/201 |
| 2004/0243650 | A1 | * | 12/2004 | McCrory et al. | 707/203 |
| 2005/0091396 | A1 | * | 4/2005 | Nilakantan et al. | 709/232 |
| 2006/0112297 | A1 | * | 5/2006 | Davidson | 714/2 |
| 2006/0143357 | A1 | | 6/2006 | Shaw et al. | |
| 2006/0168156 | A1 | * | 7/2006 | Bae et al. | 709/220 |
| 2007/0028244 | A1 | * | 2/2007 | Landis et al. | 718/108 |
| 2007/0201490 | A1 | | 8/2007 | Mahamuni | |
| 2008/0089329 | A1 | * | 4/2008 | Ajima | 370/389 |
| 2009/0158276 | A1 | * | 6/2009 | Barsness et al. | 718/100 |
| 2009/0187984 | A1 | * | 7/2009 | Archer et al. | 726/15 |

FOREIGN PATENT DOCUMENTS
GB 2396771 A 6/2004

OTHER PUBLICATIONS

Gara, A. et al, "Overview of the Blue Gene/L System Architecture", IBM Journal of Research and Development, IBM Corporation, New York, NY, US, vol. 49, No. 2-3, Mar. 1, 2005, pp. 195-212.

* cited by examiner

Primary Examiner — John Follansbee
Assistant Examiner — Imad Hussain
(74) Attorney, Agent, or Firm — Patterson & Sheridan, LLP (57) ABSTRACT Embodiments of the present invention generally provide for network virtualization in a multi-network system. The virtual network may abstract multiple, underlying physical networks connecting compute nodes on a multi-node system. A network driver and control system may route traffic on the underlying physical networks according to system and/or application requirements, and a virtual-to-physical network mapping may be controlled by the driver and control system.

21 Claims, 5 Drawing Sheets

NETWORK VIRTUALIZATION IN A MULTI-NODE SYSTEM WITH MULTIPLE NETWORKS

BACKGROUND OF THE INVENTION

Embodiments of the invention relate to computer networks, specifically to network virtualization in a system with multiple networks.

DESCRIPTION OF THE RELATED ART

Powerful computers may be designed as highly parallel systems where the processing activity of thousands of processors (CPUs) is coordinated to perform computing tasks. These systems are highly useful for a broad variety of applications, including financial modeling, hydrodynamics, quantum chemistry, astronomy, weather modeling and prediction, geological modeling, prime number factoring, and image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

The compute nodes in a parallel system typically communicate with one another over multiple communication networks. For example, the compute nodes of a Blue Gene/L system are interconnected using five specialized networks. The primary communication strategy for the Blue Gene/L system is message passing over a torus network (i.e., a set of point-to-point links between pairs of nodes). The torus network allows application programs developed for parallel processing systems to use high level interfaces such as Message Passing Interface (MPI) and Aggregate Remote Memory Copy Interface (ARMCI) to perform computing tasks and distribute data among a set of compute nodes. Of course, other message passing interfaces have been (and are being) developed. Additionally, the Blue Gene/L includes both a collective network and a global interrupt network. Further, certain nodes are also connected to a gigabit Ethernet. These nodes are typically used to perform I/O operations between the Blue Gene core and an external entity such as a file server. Other massively parallel architectures also use multiple, independent networks to connect compute nodes to one another.

SUMMARY OF THE INVENTION

One embodiment of the invention includes a method of network virtualization in a system with multiple networks. The method may generally include receiving a computing job to be executed by a plurality of compute nodes on a parallel system. The plurality of compute nodes are connected by a plurality of physical networks and each of the plurality of compute nodes includes a network driver that provides a virtual network device. The method also includes determining one of the plurality of physical networks for the plurality of compute nodes to use in executing the computing job and generating, by the network driver running on each respective compute node, a virtual network connection mapping the virtual network device of the respective compute node the determined physical network. While executing the compute job on each respective compute node, messages are routed between the virtual network device and the determined physical network.

Still another embodiment of the invention includes a computer-readable storage medium containing a program which, when executed, performs an operation for managing network virtualization in a system with multiple networks. The operation may generally include receiving a computing to job to be executed by a plurality of compute nodes on a parallel system. The plurality of compute nodes are connected by a plurality of physical networks and each of the plurality of compute nodes includes a network driver that provides a virtual network device. The operation may further include determining one of the plurality of physical networks for the plurality of compute nodes to use in executing the computing job and generating, by the network driver running on each respective compute node, a virtual network connection mapping the virtual network device of the respective compute node the determined physical network. While executing the compute job on each respective compute node, messages are routed between the virtual network device and the determined physical network.

Still another embodiment of the invention includes a parallel computing system. The system may generally include a plurality of compute nodes configured to execute a computing job, each of the plurality of compute nodes having at least a processor and a memory storing a network driver that provides a virtual network device. Additionally, each of the plurality of compute nodes may be connected by a plurality of physical networks, and the network driver on each respective compute node may be configured to route messages between the virtual network device and the physical networks while executing the computing job. The system may further include a service node having at least a processor and a memory containing a network monitor and a network manager. The network manger may generally be configured to receive a computing to job to be executed by a plurality of compute nodes, determine one of the plurality of physical networks for the plurality of compute nodes to use in executing the computing job, and notify the network driver running on each respective compute node of a mapping between the virtual network device and the determined physical network.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally provide a method and apparatus for network virtualization in a multi-network system. In one embodiment, a multi-network system includes a network driver and a control system used to manage a virtual network. The virtual network may abstract multiple, underlying physical networks connecting compute nodes on a multi-node system. The network driver and control system may route traffic on the underlying physical networks according to system and/or application requirements, and a virtual-to-physical network mapping may be controlled by the driver and control system. For example, the mapping may be made based on service requirements, system load, system state, and/or historical information. Thus, embodiments of the invention allow applications running on the system to interface with a virtual network connection while the network driver and control system package and transmit network packages across multiple physical networks. Further, application development is simplified, as the developer need not manage how an application accesses the underlying physical networks. That is, the application program composes an application to communicate over the virtual interface, allowing the system to decide at runtime how to best utilize the available underlying physical networks.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
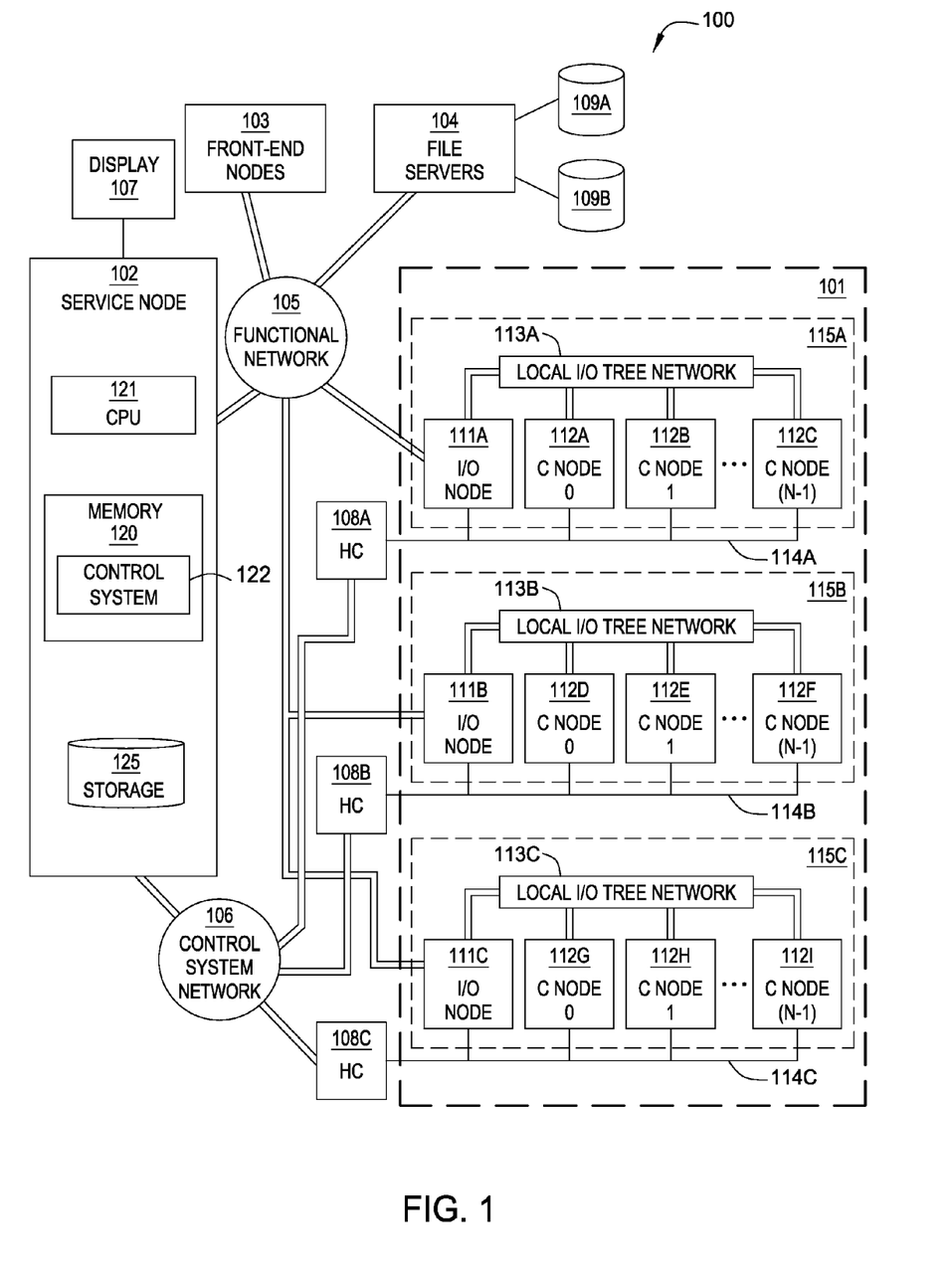
FIG. 1 is a high-level block diagram of components of a massively parallel computer system, according to one embodiment of the invention.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O operations. Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105, are used for data I/O, although they are physically separated from functional network 105.

Service node 102 may be configured to direct the operation of the compute nodes 112 in compute core 101. In one embodiment, service node 102 is a computer system that includes a processor (or processors) 121, internal memory 120, and local storage 125. An attached console 107 (i.e., a keyboard, mouse, and display) may be used by a system administrator or similar person to initialize computing jobs on compute core 101. Service node 102 may also include an internal database which maintains state information for the compute nodes in core 101, and an application which may be configured to, among other things, control the allocation of hardware in compute core 101, direct the loading of data on compute nodes 111, migrate process running on one of compute nodes 112 to another one of compute nodes 112, and perform diagnostic and maintenance functions. Illustratively, memory 120 also includes a control system 122. In embodiments of the invention, the control system 122 maps virtual network connections on individual compute nodes 112 to physical networks via a virtual network driver on each compute node 112. As such, the collective physical networks 105, 106, 113, and 114 may appear as a single, 'virtual' network to applications running on the individual compute nodes 112. In other words, instead of applications making communication requests over specific physical networks, an application may make communication requests over a single virtual network, with the control system and network drivers mapping each request to the specific physical networks. Thus, an application developer may compose an application directed to the virtual network, thereby simplifying the developer's task. Further, the parallel system may optimize what network is used at run-time, improving system efficiency. The mapping may be based on service requirements, system load, system state, and historical information.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate. In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, network performance and/or network state data may be gathered and transmitted to service node 102 without affecting the performance of that application.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

As stated, in a massively parallel computer system 100, compute nodes 112 may be logically arranged in a three-dimensional torus, where each compute node 112 may be identified using an x, y and z coordinate.

Figure 2:
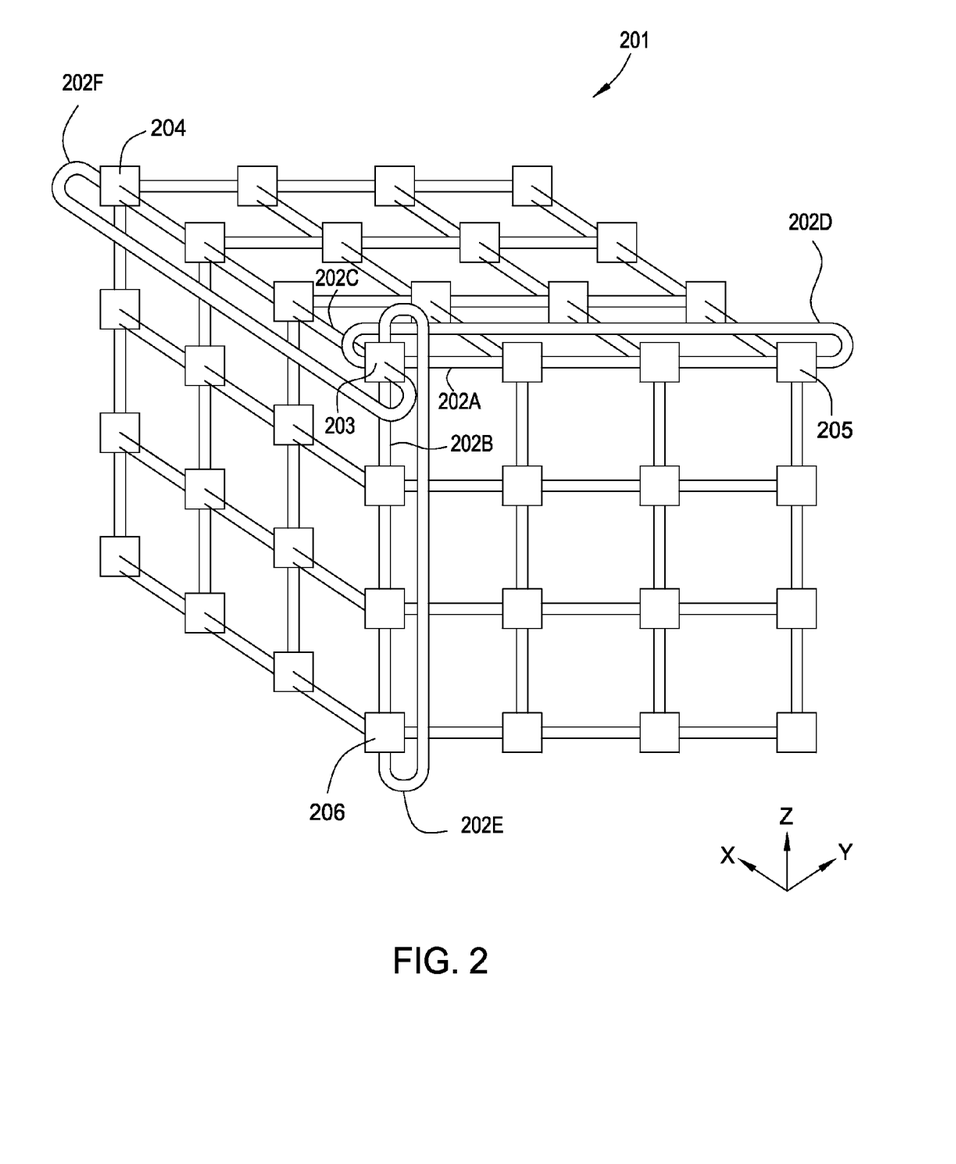
FIG. 2 is a conceptual illustration of a three-dimensional torus network of system, according to one embodiment of the invention.

FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a Blue Gene/L system may be configured with 65,536 compute nodes 112 along with and an additional 1024 I/O nodes 111. Illustratively, each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
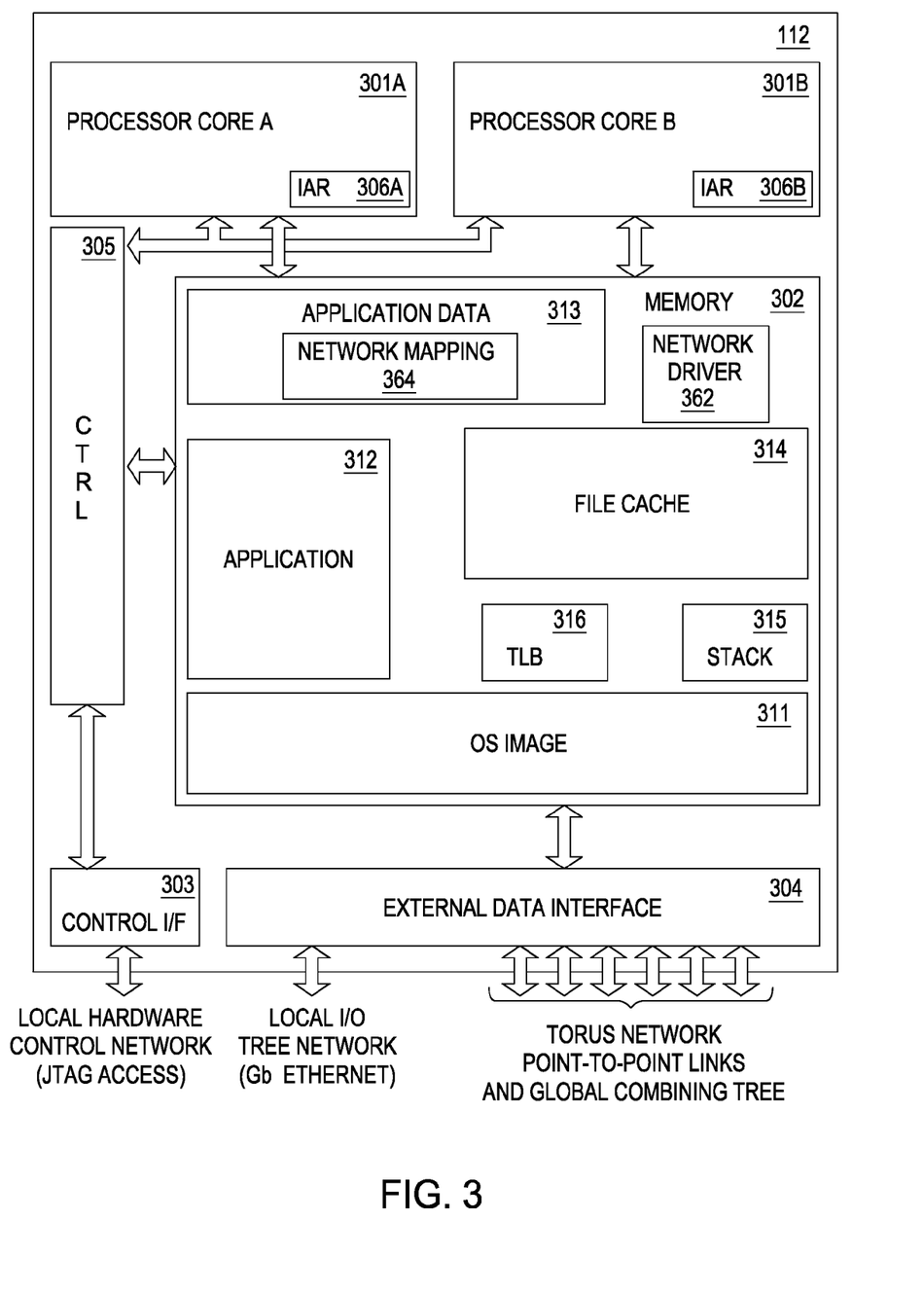
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, each having an instruction address register 306A and 306B. Compute node 112 also includes memory 302 used by both processor cores 301; an external control interface 303 which is coupled to local hardware control network 114 (e.g., control system network 106); an external data communications interface 304 which is coupled to the corresponding local I/O tree network 113 and the corresponding six node-to-node links 202 of the torus network 201; and includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 113, and each I/O node 113 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313, as required. Illustratively, memory 302 also includes a file cache 314, i.e., a cache of data read from or to be written to an I/O file. Operating system image 311 provides a copy of a simplified-function operating system running on compute node 112, referred to as a compute node kernel. Operating system image 311 may include a minimal set of functions required to support operation of the compute node 112.

Application code image 312 represents a copy of the parallel program being executed by compute nodes 112. Illustratively, memory 302 includes a copy of a computer program being executed by multiple compute nodes 112. Where the program is very large and/or complex, the program may be subdivided into code fragments which are distributed to different compute nodes 112 to cooperate and, collectively, accomplish a parallel computing task. If a required code fragment is not present in memory 302, a translation lookaside buffer 316 (TLB) may provide the location of the node that contains the fragment. The fragment is then fetched from the remote node and stored in local memory. Program execution may then continue. Memory 302 may also include a call-return stack 315 for storing the states of procedures which must be returned to, which is shown separate from application code image 302, although it may be considered part of application code state data.

In one embodiment, the application code 312 may be present and executing on thousands of compute nodes 112, where each compute node executes the same application 312 but maintains application data 313 local to a given compute node 112. Further, application 312 running on the compute nodes 112 may be configured to share application data 313 using well known message passing techniques (e.g., MPI or ARMCI). The memory 302 also includes a network driver 362. In one embodiment, the network driver 362 may receive communication requests from the application 312 and transmit each the request over one or more physical networks based on a network mapping 364. The network mapping 364 may include a list of virtual network connections, represented as relationships between virtual networks (known to the application 312) and the physical networks provided by a given multi-node or massively parallel system. Further, application 312 may communicate with a network driver 362 to deliver messages to (and receive messages from), a virtual network abstracting the underlying physical networks. For example, the network driver 362 may provide a virtualized network interface for application 312 built over the torus, tree and JTAG networks of a Blue Gene system. In such a case, application developers may write an application to simply communicate using the virtual network interface provided network driver 362, leaving it to the system to determine how to actually route messages using one or more available physical networks.

As stated, application 312 may be configured to transmit messages from one compute node to another compute node in parallel system 100. For example, the MPI call of MPI_Send( ); may be used by application 312 to transmit a message from one compute node to another. On the other side of the communication, the receiving compute node 112 may use the MPI call MPI_Receive( ); to receive the message. In such a case, the network mapping 364 could map a 'virtual network 0,' as known to the application 312, to the torus network. The network driver 362 may receive the MPI message from the application 312 to be sent over virtual network 0 and transmit the MPI message by encapsulating it within a set of packets and transmitting the packets over the torus network of point-to-point links.

In some embodiments, the network mapping 364 may be maintained by the network driver 362 and the control system 122. The actual mappings selected from a virtual network and a particular underlying physical network may be based on service requirements, system load, system state, and historical network behaviors, among other things. Further, the network driver 362 and the control system 122 may change the network mapping during the execution of the application 312. For example, application 312 may initiate a virtual network connection over a virtual network 0, mapped to the torus network. Initially, all network traffic directed over the virtual network 0 connection by the application 312 is transmitted over the torus network by the network driver 362. However, if during execution, network traffic is heavy on the torus network, and lighter on the local I/O tree network, the control system 122 may update the network mapping 364 such that some network traffic is directed over virtual network 0 connection such that it is no longer transmitted over the torus, but instead over the local I/O tree network.

In one embodiment, the network driver 362 may select networks for transmission based on a message priority. For example, high priority communications may be transmitted over the fastest network, or the network with the greatest bandwidth. Further, the network driver 362 may also suppress the transmission of additional messages over the network that a high priority request is sent on until the high priority response is received. The network driver 362 may also segregate messages based on priority, transmitting messages on different physical networks based on the message priority.

Alternatively, the network driver 362 may transmit high priority messages over multiple networks in order to optimize reliability and performance. In such a case, the network driver 362 on the requesting node may return only the first response to the application 312, and include logic to ignore duplicate responses. Further, the network drivers 362 on the receiving nodes 112 may include logic to recognize duplicate requests. To conserve processing resources, the drivers 362 on the receiving nodes may process the first request received and cache the response for a limited time. Accordingly, the driver 362 on the receiving node may merely re-send the response instead of repeating processing for a duplicate request.

In yet another embodiment, the application 312 may have, and the network driver 362 may support multiple virtual networks. Accordingly, the mapping 364 may include multiple mappings between different virtual networks and one or more underlying physical networks. It should be understood that within the mapping 364, different virtual networks may all map to the same physical network. In other words, while the application 312 may make communication requests over connection 0 and connection 1, the mappings for both connections 0 and 1 may be to the same physical network, e.g., the torus network. Accordingly, in such a scenario, even though the application 312 makes separate communication requests over virtual connection 0 and 1, the driver transmits both messages over the same physical network (the torus network in this example).

Figure 4:
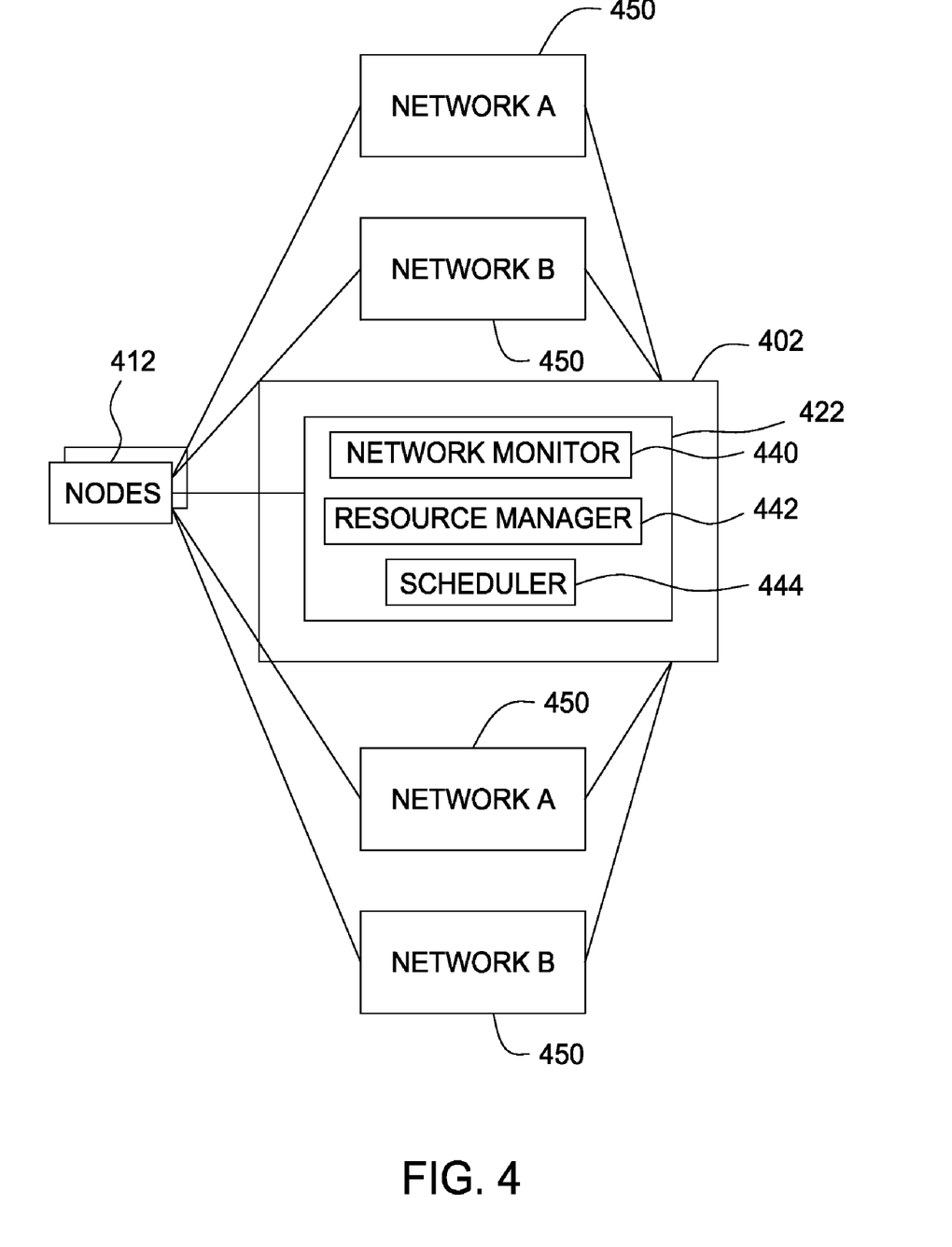
FIG. 4 is a block diagram illustrating a system for network virtualization on a multi-node computer system, according to one embodiment of the invention.

FIG. 4 is a block diagram illustrating an example of network virtualization on a multi-node computer system, according to one embodiment of the invention. As shown, FIG. 4 includes multiple compute nodes 412, four different physical networks 450 (labeled as Network A, B, C, and D), and service node 402. Networks A-D each represent a distinct physical computer network over which nodes 412 communicate with each other. For example, in context of a Blue Gene/L system, the networks A-D include the torus, combining tree, JTAG, and Ethernet I/O networks. Also as shown, service node 402 contains a control system 422, which includes a network monitor 440, a job scheduler 444, and a resource manager 442.

In one embodiment, the network monitor 440 may provide an interface between the networks 450 and the control system 422 configured to receive information about each of the physical networks. Network information may include static information such as network topology (mesh, torus, ring, bus, tree, etc.) and network capabilities. One example of a network capability includes arithmetic logic unit reduction operations, e.g., an operation for increasing available network bandwidth. Network information may also include dynamic information related to network status and/or utilization (idle, busy, unavailable, etc.), network latency, etc.

In one embodiment, the job scheduler 444 may use data received from the network monitor 440 and connections with nodes 412 to manage network traffic, based on the networking requirements of specific jobs. For example, an application, named Job 1, may be running on a group of compute nodes A. The compute nodes A may be communicating with each other over a physical network "A." As stated previously, a relationship between a virtual network and the physical network "A" may be captured in network mappings (not shown) on Job 1's nodes 412. More specifically, the mapping may be between a virtual network provided by a network driver running on each compute node of the "A" nodes and an underlying physical network 250 connecting each of the "A" nodes. In this scenario, assume that the "A" nodes are running a distributed application and that the network A is the torus network of a Blue Gene system.

Assume further however, that the scheduler 444 receives a request to run another application, named Job 2. In this example, Job 2 may specifically require a mesh network topology, whereas Job 1 has no specific network requirements. The scheduler 444 may determine (via the network monitor 440) that Network A is the only available mesh network. In such a case, the scheduler 444 may re-map the virtual network of Job 1 to physical network B by updating the network mappings on the compute nodes running Job 1, i.e., each of the "A" nodes. The scheduler 444 may then map network A to a virtual network for Job 2. Accordingly, Job 1 is not affected, and Job 2 may be started using the mesh network of network A.

In some embodiments, the resource manager 442 may also manage network traffic using information derived from the network monitor 440, and connections into network drivers on each of the compute nodes 412. In some embodiments, an application may open a single network connection via a request to the resource manager 442. In response, the resource manager 442 may determine via the network monitor 440 that Network A is available, and map a virtual network to Network A. Further, during execution of the application, the resource manager 442 may query the network monitor 440 and determine that Network A is down and Network B is idle. In such a case, the resource manager 442 may re-map the virtual network for the application to Network B until Network A is available again.

Figure 5:
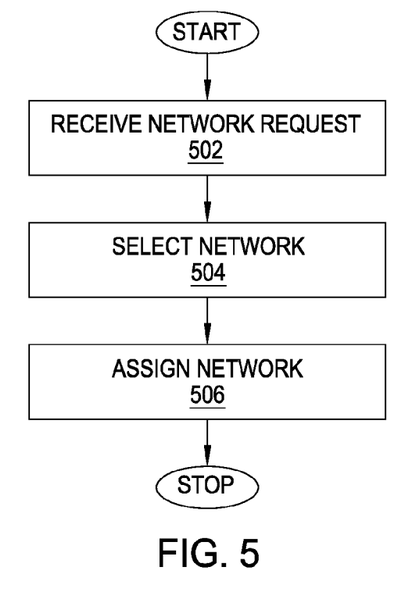
FIG. 5 is a flowchart illustrating a method for providing connection-level network virtualization on a multi-node computer system, according to one embodiment of the invention.

FIG. 5 is a flowchart illustrating a method 500 for connection-level network virtualization, according to one embodiment of the invention. As shown, the method 500 begins with step 502 where a control system 122 receives a request for a network connection from a job. The request may come in the form of an open/initiate session request from the job, and may include specific network requirements (such as a request for a specific physical network, or network characteristics such as topology, utilization, latency, etc.), and a virtual network identifier, by which the job identifies communications over the connection to a network driver 362.

At step 504, the control system 122 selects a physical network for the virtual network connection based on network requirements (if any), and available resources. As described above, if the requesting job requires a specific network, and the network is in use by another job (or another connection of the same job) that does not require the specific network, the scheduler 444 may re-map the other job/connection to another physical network. At step 506, the control system 122 may assign the network to the virtual network connection via a network mapping 364 on the job's nodes.

Figure 6:
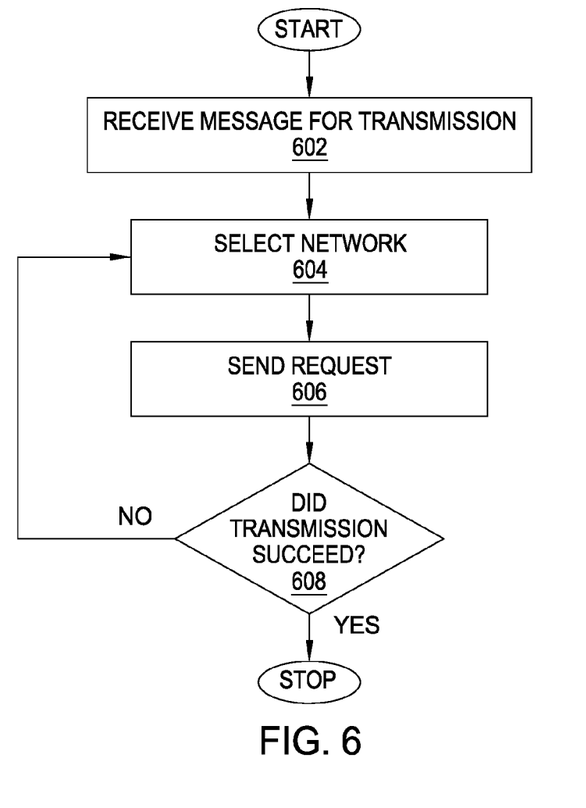
FIG. 6 is a flowchart illustrating a method for transmitting messages over a virtualized network, according to one embodiment of the invention.

FIG. 6 is a flowchart illustrating a method 600 for transmitting messages over a virtualized network, according to one embodiment of the invention. As shown, the method 600 begins at step 602, where the network driver 362 receives a message for transmission. The message may identify a virtual network over which the message is to be transmitted.

At step 604, the network driver 362 selects the physical network over which the message is transmitted. The physical network selection may be based on a network mapping 364 which maps the identified virtual connection to a specific physical network. Further, the network driver may select one or more networks for transmitting the message based on a message priority. For example, high priority messages may be sent simultaneously over more than one network to optimize the response time.

At step 606, the network driver 362 may transmit the message over the selected network(s). At step 608, the driver 362 may determine whether the transmission succeeded. If so, the process completes. If not, the process may repeat from step 604. In the case of a network failure, the driver 362 may select a different physical network at step 604.

As described above, in multi-node, multi-network systems such as a Blue Gene/L, compute nodes are interconnected via multiple physical network connections. Other massively parallel computer systems also use multiple, independent networks to connect compute nodes. These networks may provide multiple paths between nodes, each with distinct characteristics. Embodiments of the invention may be used to virtualize all of the available physical networks as a single network, as well as dynamically alter a virtual to physical network mapping, without affecting running applications on the parallel system. Advantageously, doing so may simplify application development, as a programmer needs only mange one consistent virtual connection, not three, four, five or more. Instead, a resource manager/scheduler running on the parallel system has a wide flexibility to manage network mappings between a virtual network connection and multiple underlying physical networks. For example, network mappings may be changed to alter network traffic patterns, transparently avoid/work around physical network problems, and to increase overall system utilization.

While the foregoing is directed to embodiments of the present invention, other and further embodiments of the invention may be devised without departing from the basic scope thereof, and the scope thereof is determined by the claims that follow.

What is claimed is:

1. A method of network virtualization in a system with multiple physical networks, comprising:
   receiving a computing job to be executed by a plurality of compute nodes on a parallel system, wherein the plurality of compute nodes are connected by a plurality of separate physical networks, and wherein each of the plurality of compute nodes includes a network driver that provides a virtual network device;
   determining one of the plurality of physical networks for the plurality of compute nodes to use in executing the computing job;
   generating, by the network driver running on each respective compute node, a virtual network connection mapping the virtual network device of the respective compute node to the determined physical network; and
   while executing the compute job on each respective compute node:
      routing messages between the virtual network device and the determined physical network, and
      modifying the mapping between the virtual network device and the determined physical network on at least a first one of the plurality of compute nodes to a different physical network, of the plurality of physical networks.

2. The method of claim 1, wherein at least one of the plurality of networks is a toroidal mesh network connecting each respective compute node to a nearest 2N neighboring compute nodes in N dimensions.

3. The method of claim 1, wherein at least one of the plurality of networks is a global combining tree network.

4. The method of claim 1, wherein determining one of the plurality of physical networks for the plurality of compute nodes to use in executing the computing job comprises evaluating static information related to network topology and network capabilities of each respective network against one or more characteristics of the computing job.

5. The method of claim 1, wherein determining one of the plurality of physical networks for the plurality of compute nodes to use in executing the computing job comprises evaluating dynamic characteristics related to network status, utilization or network latency to determine which of the plurality of physical networks to use in executing the computing job.

6. The method of claim 1, wherein a job request associated with the computing job specifies a request to use a specific one of the plurality of underlying physical networks.

7. The method of claim 1, wherein a job request associated with the computing job specifies one or more network requirements for executing the computing job, and wherein determining one of the plurality of physical networks comprises evaluating the one or more requirements against the plurality of physical networks to identify the best match between the requirements and the characteristics.

8. A non-transitory computer-readable storage medium containing a program which, when executed, performs an operation for managing network virtualization in a system with multiple physical networks, the operation comprising:
   receiving a computing to job to be executed by a plurality of compute nodes on a parallel system, wherein the plurality of compute nodes are connected by a plurality of separate physical networks, and wherein each of the plurality of compute nodes includes a network driver that provides a virtual network device;
   determining one of the plurality of physical networks for the plurality of compute nodes to use in executing the computing job;
   generating, by the network driver running on each respective compute node, a virtual network connection mapping the virtual network device of the respective compute node to the determined physical network; and
   while executing the compute job on each respective compute node:
      routing messages between the virtual network device and the determined physical network, and
      modifying the mapping between the virtual network device and the determined physical network on at least a first one of the plurality of compute nodes to a different physical network, of the plurality of physical networks.

9. The non-transitory computer-readable storage medium of claim 8, wherein at least one of the plurality of networks is a toroidal mesh network connecting each respective compute node to a nearest 2N neighboring compute nodes in N dimensions.

10. The non-transitory computer-readable storage medium of claim 8, wherein at least one of the plurality of networks is a global combining tree network.

11. The non-transitory computer-readable storage medium of claim 8, wherein determining one of the plurality of physical networks for the plurality of compute nodes to use in executing the computing job comprises evaluating static information related to network topology and network capabilities of each respective network against one or more characteristics of the computing job.

12. The non-transitory computer-readable storage medium of claim 8, wherein determining one of the plurality of physical networks for the plurality of compute nodes to use in executing the computing job comprises evaluating dynamic characteristics related to network status, utilization or network latency to determine which of the plurality of physical networks to use in executing the computing job.

13. The non-transitory computer-readable storage medium of claim 8, wherein a job request associated with the computing job specifies a request to use a specific one of the plurality of underlying physical networks.

14. The non-transitory computer-readable storage medium of claim 8, wherein a job request associated with the computing job specifies one or more network requirements for executing the computing job, and wherein determining one of the plurality of physical networks comprises evaluating the one or more requirements against the plurality of physical networks to identify the best match between the requirements and the characteristics.

15. A parallel computing system, comprising:
   a plurality of compute nodes configured to execute a computing job, each of the plurality of compute nodes having at least a processor and a memory storing a network driver that provides a virtual network device, wherein each of the plurality of compute nodes is connected by a plurality of separate physical networks, and wherein the network driver on each respective compute node is configured to route messages between the virtual network device and a determined one of the separate physical networks while executing the computing job; and a service node having at least a processor and a memory containing a network monitor and a network manager, wherein the network manager is configured to:
 receive a computing to job to be executed by a the plurality of compute nodes,
 determine one of the plurality of physical networks for the plurality of compute nodes to use in executing the computing job, and
 notify the network driver running on each respective compute node of a mapping between the virtual network device and the determined physical network, and
 modify the mapping between the virtual network device and the determined physical network to a different physical network, of the plurality of physical networks.

16. The parallel computing system of claim 15, wherein at least one of the plurality of networks is a toroidal mesh network connecting each respective compute node to a nearest 2N neighboring compute nodes in N dimensions.

17. The parallel computing system of claim 15, wherein at least one of the plurality of networks is a global combining tree network.

18. The parallel computing system of claim 15, wherein determining one of the plurality of physical networks for the plurality of compute nodes to use in executing the computing job comprises evaluating static information related to network topology and network capabilities of each respective network against one or more characteristics of the computing job.

19. The parallel computing system of claim 15, wherein determining one of the plurality of physical networks for the plurality of compute nodes to use in executing the computing job comprises evaluating dynamic characteristics related to network status, utilization or network latency to determine which of the plurality of physical networks to use in executing the computing job.

20. The parallel computing system of claim 15, wherein a job request associated with the computing job specifies a request to use a specific one of the plurality of underlying physical networks.

21. The parallel computing system of claim 15, wherein a job request associated with the computing job specifies one or more network requirements for executing the computing job, and wherein determining one of the plurality of physical networks comprises evaluating the one or more requirements against the plurality of physical networks to identify the best match between the requirements and the characteristics.

* * * * *